United States Patent
Jardine-Skinner

(10) Patent No.: US 12,524,272 B2
(45) Date of Patent: Jan. 13, 2026

(54) SYNCHRONIZING COMPUTING RESOURCES TO PROCEED WITH A TASK

(71) Applicant: International Business Machines Corporation, Armonk, NY (US)

(72) Inventor: Evan Garrick Jardine-Skinner, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 17/668,089

(22) Filed: Feb. 9, 2022

(65) Prior Publication Data
US 2023/0251905 A1    Aug. 10, 2023

(51) Int. Cl.
*G06F 9/50* (2006.01)
*G06F 9/52* (2006.01)

(52) U.S. Cl.
CPC ............. *G06F 9/5027* (2013.01); *G06F 9/52* (2013.01)

(58) Field of Classification Search
CPC ................................. G06F 9/5027; G06F 9/52
See application file for complete search history.

(56) References Cited

U.S. PATENT DOCUMENTS

| | | | |
|---|---|---|---|
| 9,639,401 B1* | 5/2017 | Bertram | G06F 9/4887 |
| 2009/0077085 A1* | 3/2009 | Olivieri | G06F 16/2393 |
| | | | 707/999.009 |
| 2017/0302448 A1 | 10/2017 | Luk et al. | |
| 2019/0097802 A1 | 3/2019 | Rowe et al. | |
| 2019/0155597 A1 | 5/2019 | Lander et al. | |
| 2020/0310857 A1* | 10/2020 | Sharma | G06F 9/485 |
| 2021/0341303 A1* | 11/2021 | Rappel-Kroyzer | G08G 1/0141 |
| 2022/0164738 A1* | 5/2022 | Liu, Jr. | G06F 40/279 |
| 2024/0048488 A1* | 2/2024 | Togari | H04L 12/4641 |

FOREIGN PATENT DOCUMENTS

CN         113220410 A     8/2021

OTHER PUBLICATIONS

Vault Team, "Injecting Vault Secrets Into Kubernetes Pods via a Sidecar", available online at <https://www.hashicorp.com/en/blog/injecting-vault-secrets-into-kubernetes-pods-via-a-sidecar>, Dec. 19, 2019, 13 pages.

* cited by examiner

Primary Examiner — Wynuel S Aquino
Assistant Examiner — Jordan Scott Motter
(74) Attorney, Agent, or Firm — CHIP LAW GROUP

(57) ABSTRACT

An example embodiment may include one or more of writing, by a computing resource, an entry to a database, the entry comprising an identifier of the computing resource, an identifier of a cluster with which the computing resource is associated, and a count of computing resources associated with that cluster, monitoring the entry, detecting, based on the monitoring, that the entry includes a time-at-which-to-proceed value, and proceeding with a first task based on the time-at-which-to-proceed.

12 Claims, 11 Drawing Sheets

100

200

250

370

400

```
         ┌─────────┐
         │  Start. │
         └────┬────┘
              │
              ▼
    ┌───────────────────────┐
    │ 402                   │
    │ Write a ready-to-proceed entry
    │ to the shared database.│
    └───────────┬───────────┘
                │
                ▼  ◄──────────────┐
    ┌───────────────────────┐    │
    │ 404                   │    │
    │ Monitor the ready-to-proceed│
    │ entry.                │    │
    └───────────┬───────────┘    │
                │                │
                ▼                │
           ╱ 406 ╲   No          │
          ╱ Does the ╲───────────┘
          ╲ entry include a valid
           ╲ time to proceed? ╱
              ╲           ╱
                  │ Yes
                  ▼
    ┌───────────────────────┐
    │ 408                   │
    │ Proceed with the task at entry's
    │ time-to-proceed value.│
    └───────────────────────┘
```

FIG. 4A

SYNCHRONIZING COMPUTING RESOURCES TO PROCEED WITH A TASK

BACKGROUND

A microservice-based computing application may depend upon services provided by several microservices running on distinct computer resources located in disparate locations. For example, one application may include a number of database microservices and a number of web microservices. There are situations in which the application needs to tightly coordinate the work of all of its microservices. For example, the application may need to tell a number of its web microservices to use a new TLS ("Transport Layer Security") certificate to securely communicate with a number of its database microservices. To prevent downtime during the update, all of these microservices need to start using the new TLS certificate at the same time.

SUMMARY

An example embodiment provides a computer-readable storage medium storing instructions that when executed perform writing, by a computing resource, an entry to a database, the entry comprising an identifier of the computing resource, an identifier of a cluster with which the computing resource is associated, and a count of computing resources associated with that cluster; monitoring the entry; detecting, based on the monitoring, that the entry includes a time-at-which-to-proceed value; and proceeding with a first task based on the time-at-which-to-proceed.

Another example embodiment provides a computer-readable storage medium storing instructions that when executed perform monitoring a database for readiness-to-proceed entries written by members of a plurality of computing resources, each computing resource associated with one of a known plurality of clusters; from the monitored entries and from the known plurality of clusters, determining a threshold count of members of the plurality of computing resources; and based on the monitoring, in response to a count of readiness-to-proceed entries reaches the threshold, updating the readiness-to-proceed entries with a time-at-which-to-proceed value.

A further embodiment provides a computing system comprising one or more processors; and one or more memories storing instructions that when executed perform monitoring a database for readiness-to-proceed entries written by members of a plurality of computing resources, each computing resource associated with one of a known plurality of clusters; from the monitored entries and from the known plurality of clusters, determining a threshold count of members of the plurality of computing resources; and based on the monitoring, in response to a count of readiness-to-proceed entries reaches the threshold, updating the readiness-to-proceed entries with a time-at-which-to-proceed value.

BRIEF DESCRIPTION OF THE DRAWINGS

FIG. 4A is a flow diagram of a microservice being synchronized by a synchronizer process, according to example embodiments.

DETAILED DESCRIPTION

Figure 1:
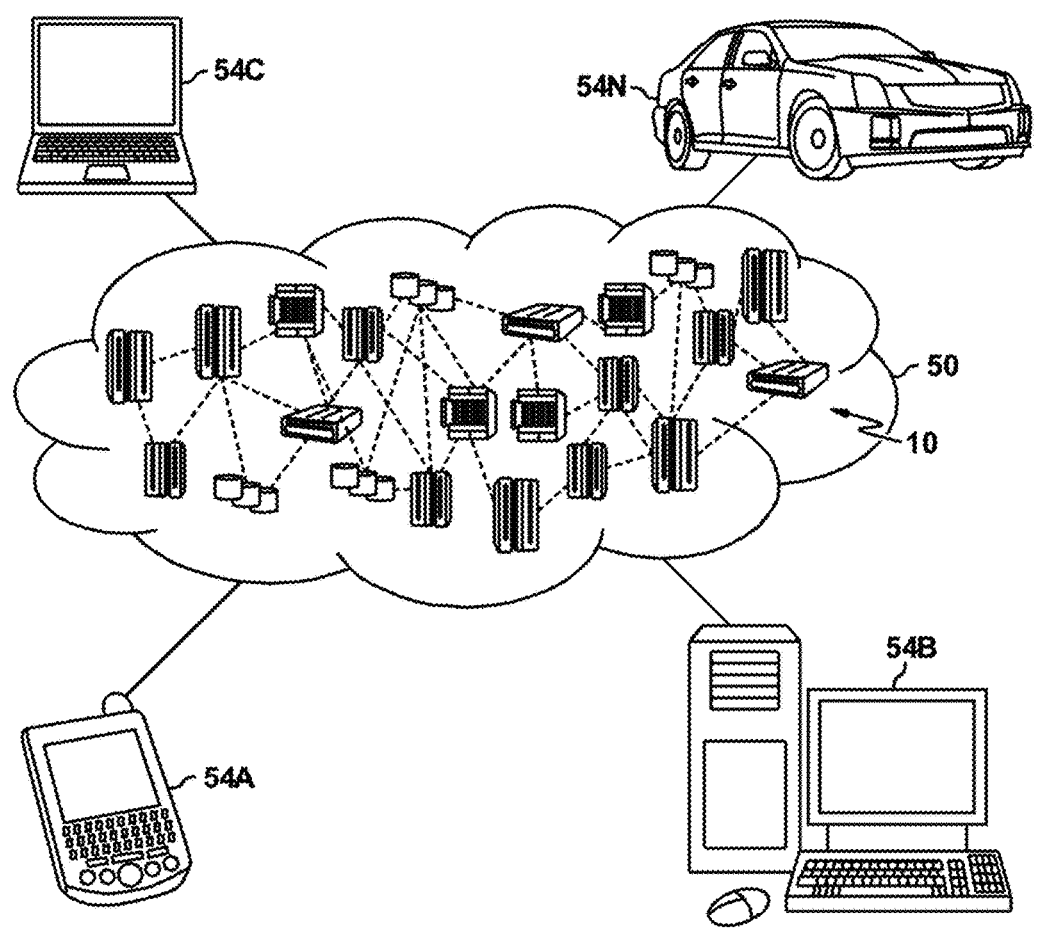
FIG. 1 depicts a cloud computing environment according to an embodiment of the present invention.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants ("PDAs")).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service ("SaaS"): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service ("PaaS"): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service ("IaaS"): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, semantic interoperability and an infrastructure that includes a network of interconnected nodes. A microservice-based computing application may depend upon services provided by several microservices running on distinct computer resources located in disparate locations. For example, one application may include a number of database microservices and a number of web microservices. There are situations in which the application needs to tightly coordinate the work of all of its microservices by, in one embodiment, having all the microservices using a new TLS certificate at the same time. However, it is not a trivial task for the application to coordinate all of its microservices.

An example embodiment provides, when synchronization in starting a task is needed, each of an application's microservices writes a "ready-to-proceed" entry to a database that is accessible to all of them. Each microservice knows the number of microservices in its cluster (e.g., web or database) associated with the application and includes that number in the ready-to-proceed entry. A "synchronizer" process (which may, but need not, be associated with one of the microservices) reviews the database entries. As it knows how many clusters are associated with the application, and can read the number of microservices in each cluster from the ready-to-proceed entry, it knows when all of the microservices have indicated their readiness to proceed. When that point has been reached, the synchronizer writes a time at which to proceed into each of the ready-to-proceed entries. The microservices monitor their own entries, note when there is a valid time to proceed, and each starts performing that task (e.g., using the new TLS certificate) at that time.

When synchronization in starting a task is needed, each of an application's microservices writes a "ready-to-proceed" entry to a database that is accessible to all of them. Each microservice knows the number of microservices in its cluster associated with the application and includes that number in the ready-to-proceed entry. A "synchronizer" process reviews the database entries. As it knows how many clusters are associated with the application, and can read the number of microservices in each cluster from the ready-to-proceed entry, it knows when all of the microservices have indicated their readiness to proceed. When that point has been reached, the synchronizer writes a time at which to proceed into each of the ready-to-proceed entries. The microservices monitor their own entries, note when there is a valid time to proceed, and each starts performing that task at that time.

Referring now to FIG. 1, a network 100 includes and illustrative cloud computing environment 50. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2A:
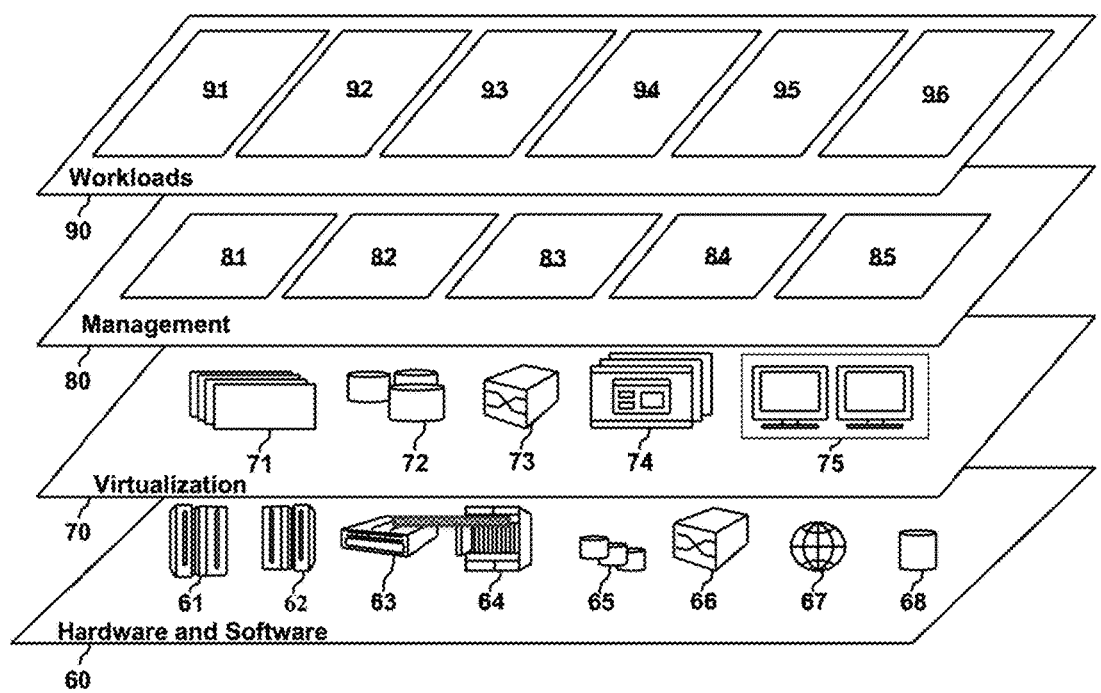
FIG. 2A depicts abstraction model layers according to an embodiment of the present invention.

Referring now to FIG. 2A, a set of functional abstraction layers 200 provided by cloud computing environment 50 (FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer") architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement ("SLA") planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and applications that utilize microservices 96.

Figure 2B:
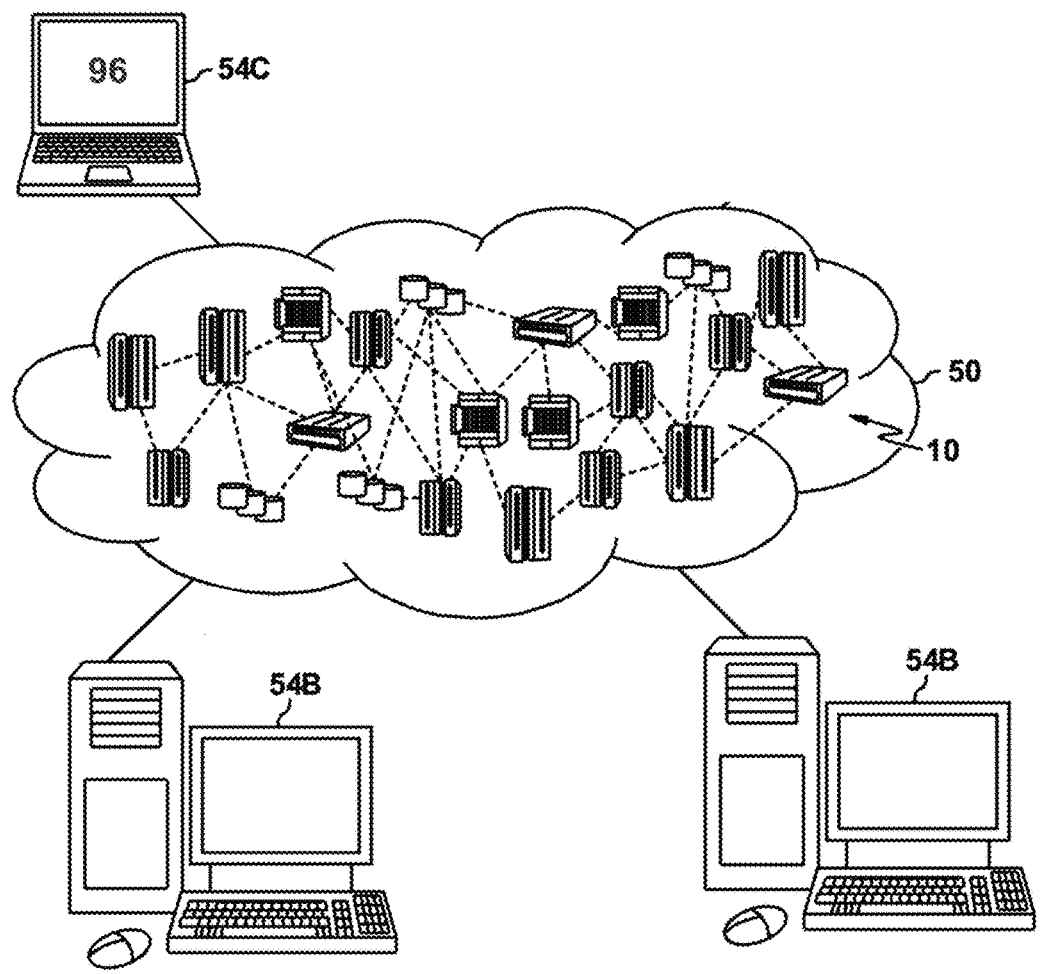
FIG. 2B depicts a network structure of a microservice-using application, according to example embodiments.

In the example of FIG. 2B, a network 250 includes an application 96 running on computer 54C utilizes multiple microservices. Generally speaking, these microservices are separated into clusters, e.g., one cluster of web microservices and one cluster of database microservices. To avoid clutter in FIG. 2B, each computer 54B represents one such cluster which may in fact consist of several individual computing devices, each one hosting one microservice for the application 96. The computers 54C and 54B communicate among themselves over a network which could be part of a cloud computing environment 50. Also to be considered is a database 10 that is accessible to all of the clustered computing devices 54B. In some embodiments, the database 10 resides on one of the hosting computing devices of a cluster 54B, but in general it need not.

Situations arise when the microservices running in the clusters 54B need to tightly synchronize their actions with one another. For example, they all need to start a new task, such as using a new security certificate, at the same time. When notified of the need for synchronization, each microservice prepares itself to begin whatever task is called for. According to embodiments of the present invention, when it is ready to proceed, each microservice causes its hosting computing device to write a "ready-to-proceed" entry to the shared database 10. (Details of this entry are explained below in reference to FIGS. 4A and 4B.) A "synchronizer" process also has access to the shared database 10. The synchronizer could be running on one of the microservice-hosting computing devices, but need not be. The synchronizer reviews this shared database 10, reading the ready-to-proceed entries associated with the new task. From the entries and from other information, the synchronizer process knows how many ready-to-proceed entries will be generated when every microservice indicates its readiness. When that number is reached, the synchronizer writes into each of the entries the time at which all the microservices are to begin the task. While this is going on, the individual microservices monitor the status of the entries they wrote. When each one sees a valid time to proceed written into its entry, it begins the task. The result is that all microservices begin the task at the same time.

Figure 4B:
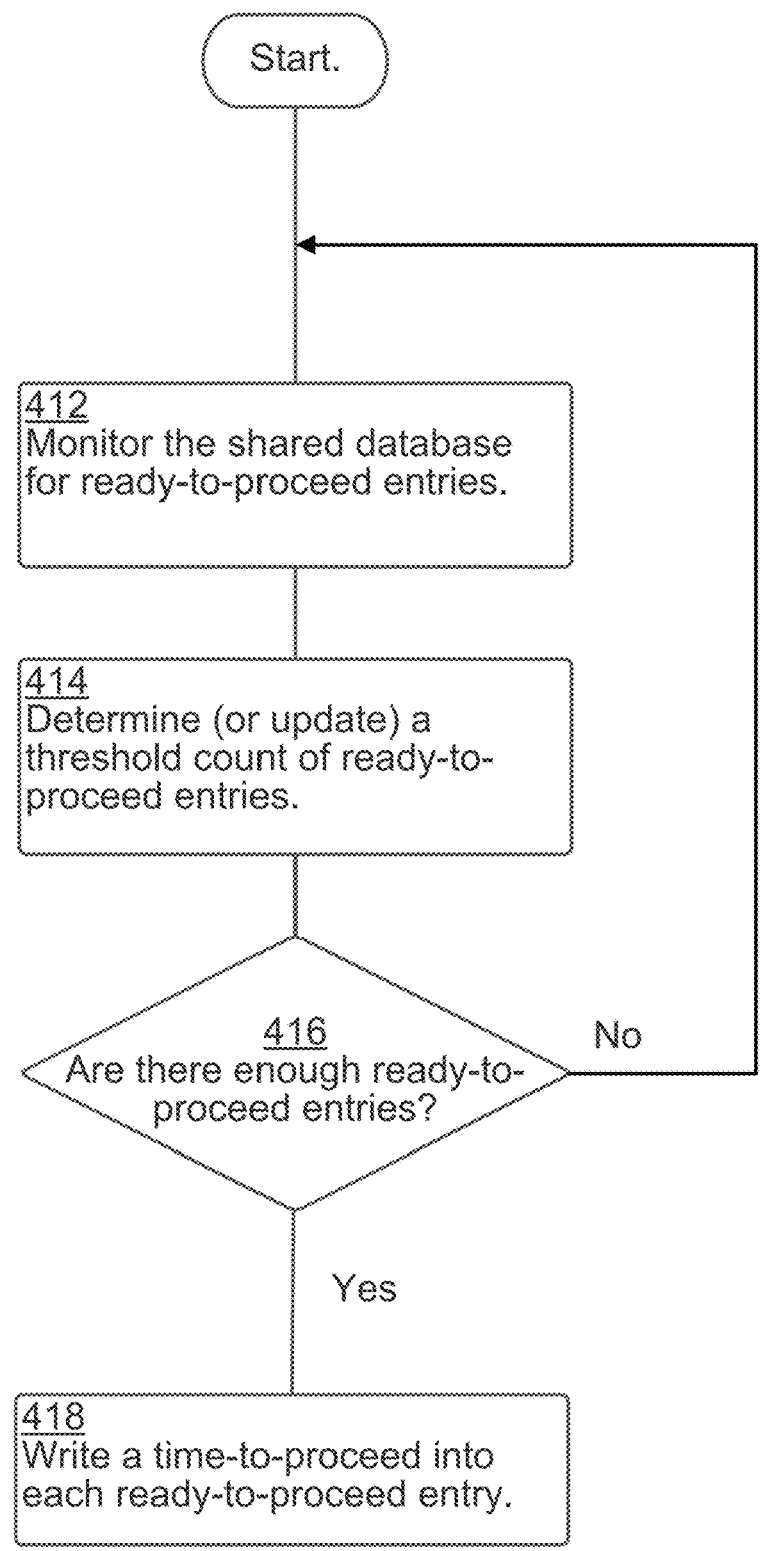
FIG. 4B is a flow diagram of a synchronizer process synchronizing multiple microservices, according to example embodiments.

The text accompanying FIGS. 4A and 4B provides details about how the synchronizer knows how many entries to expect, how entries for multiple tasks do not interfere with one another, and the like.

Figure 3A:
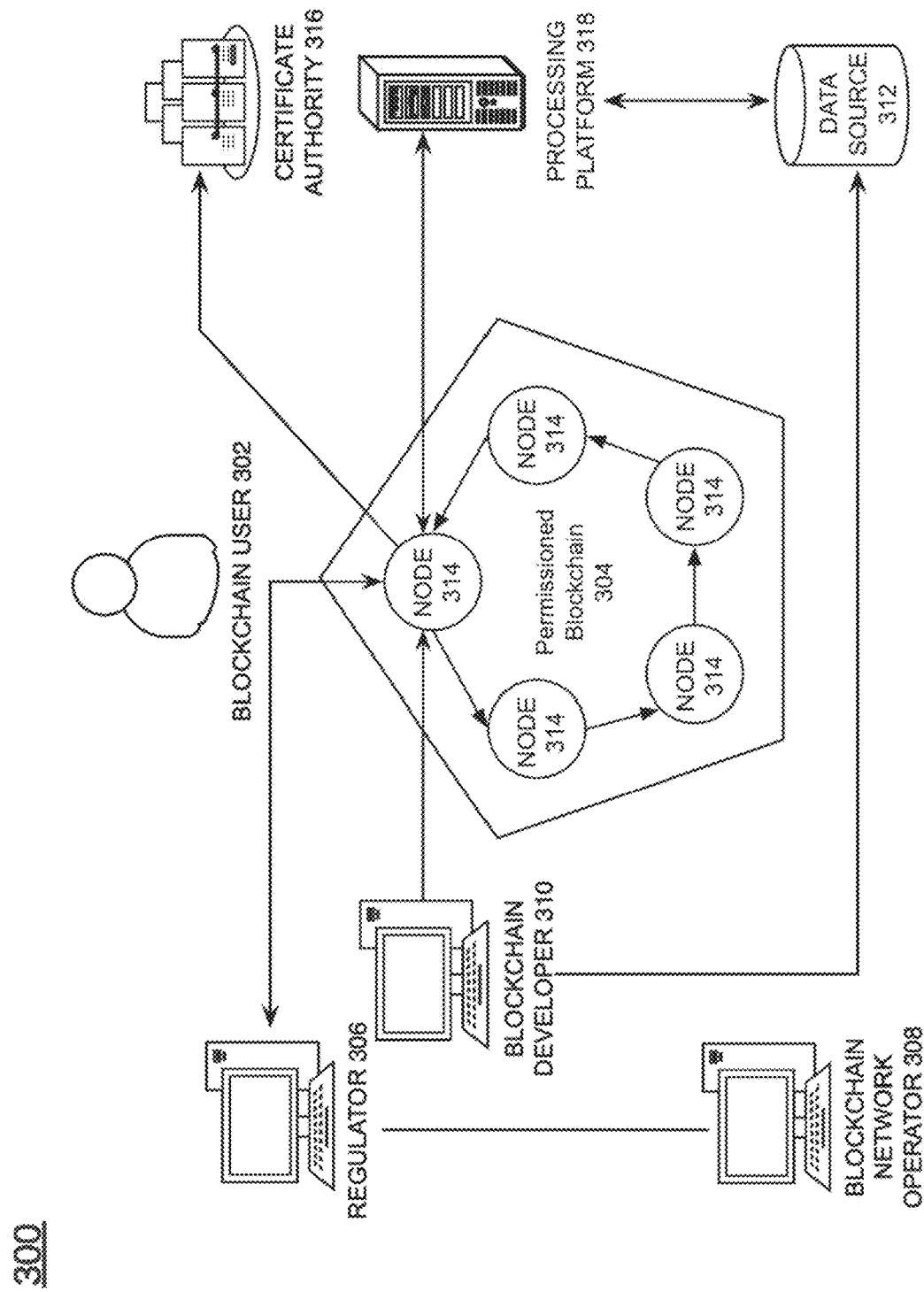
FIG. 3A illustrates a permissioned network, according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client." An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, users attempting to utilize chaincode may be required to verify their credentials on the traditional data source 312. To confirm the user's authorization, chaincode can use an out-of-band connection to this data through a traditional processing platform 318.

Figure 3B:
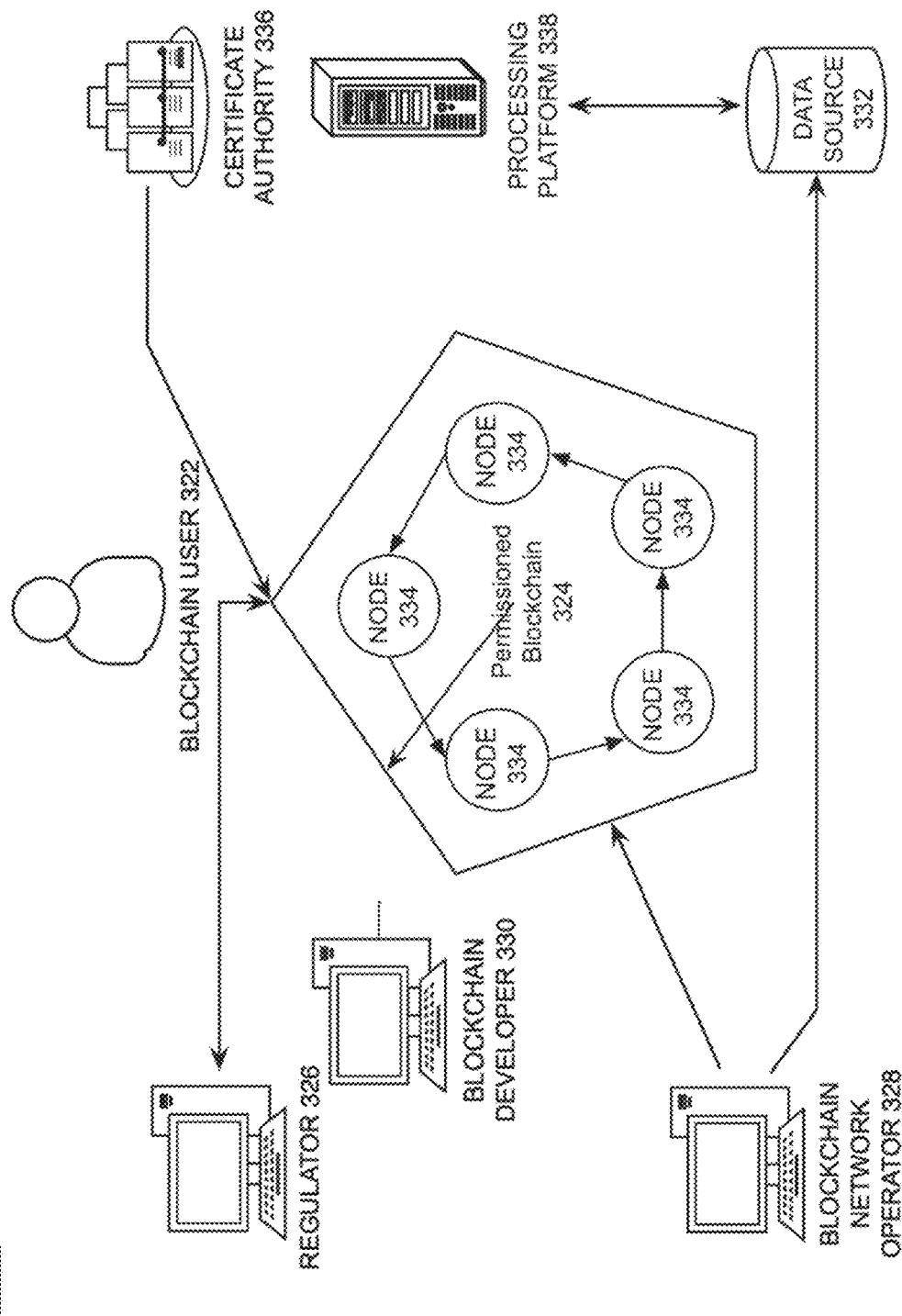
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify her credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
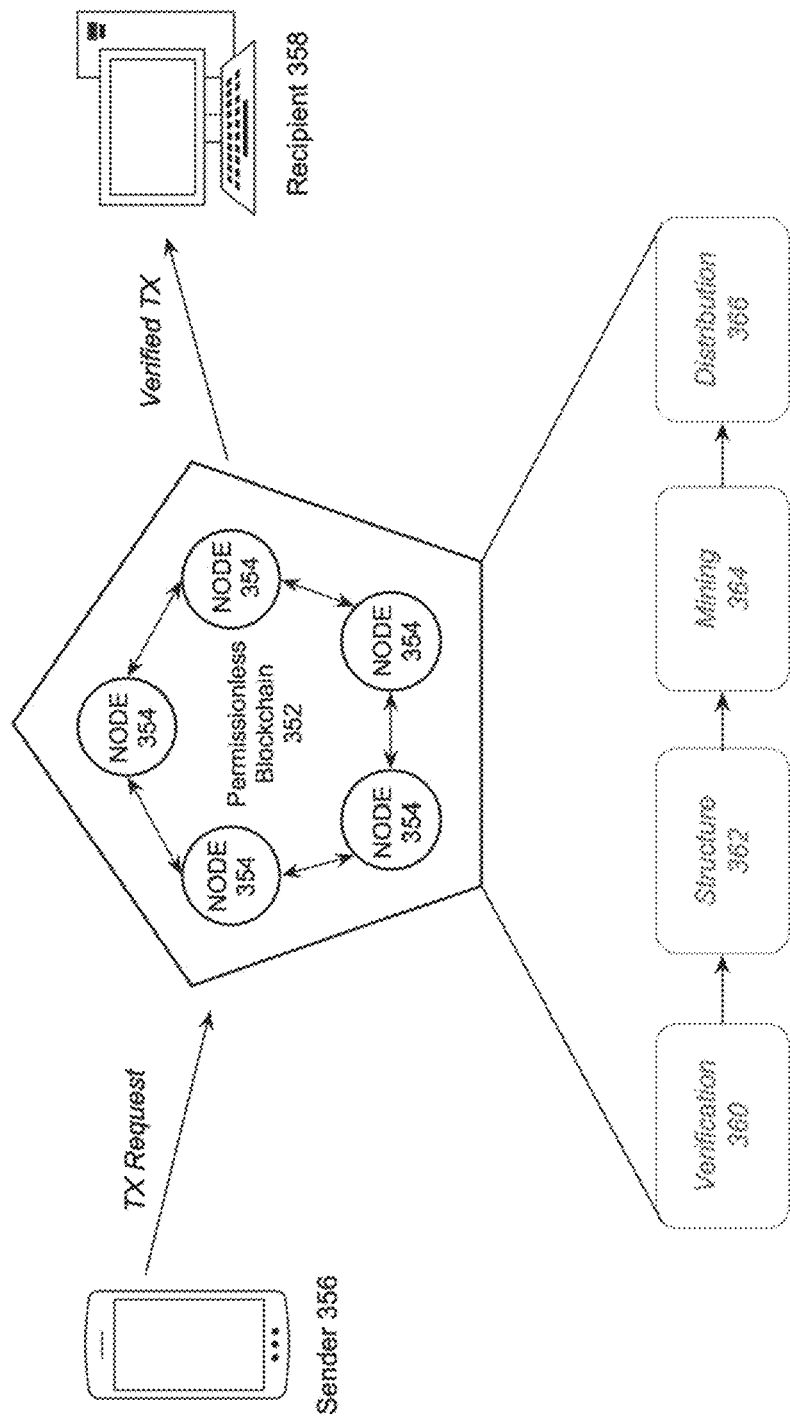
FIG. 3C illustrates a further permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work ("PoW") which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
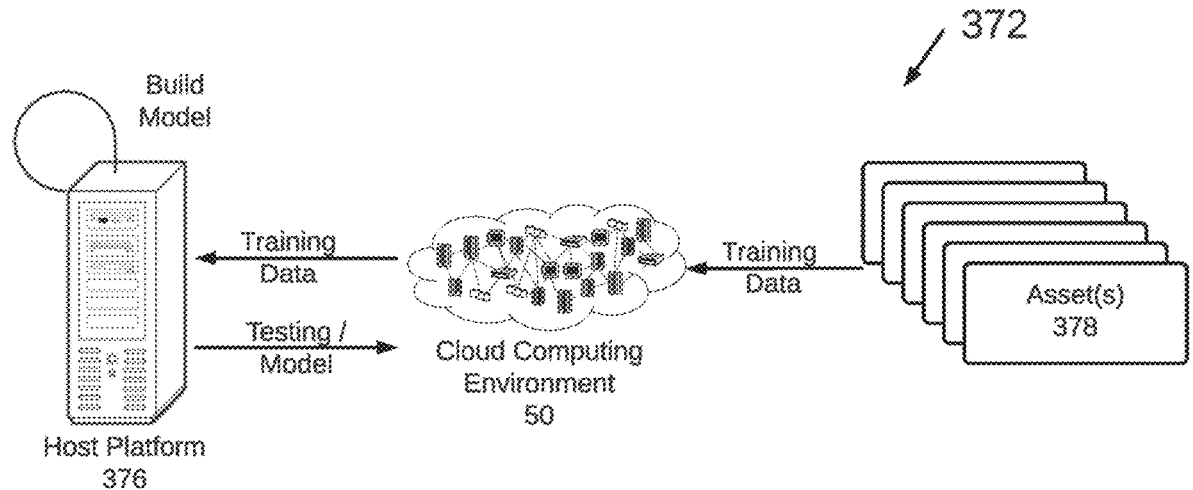
FIG. 3D illustrates a cloud computing environment which stores machine learning (artificial intelligence) data.
Figure 3D:
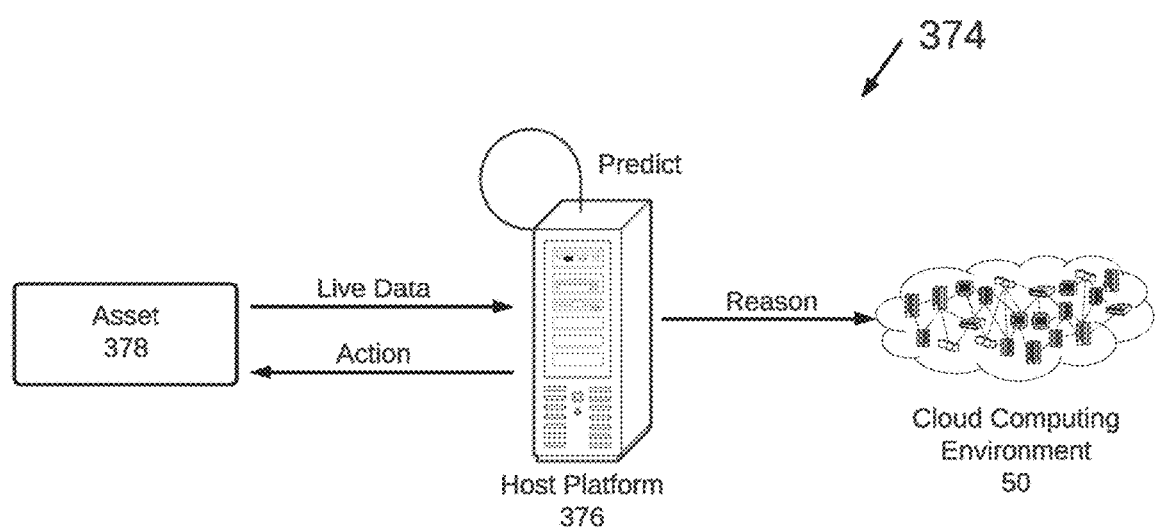
Figure 3E:
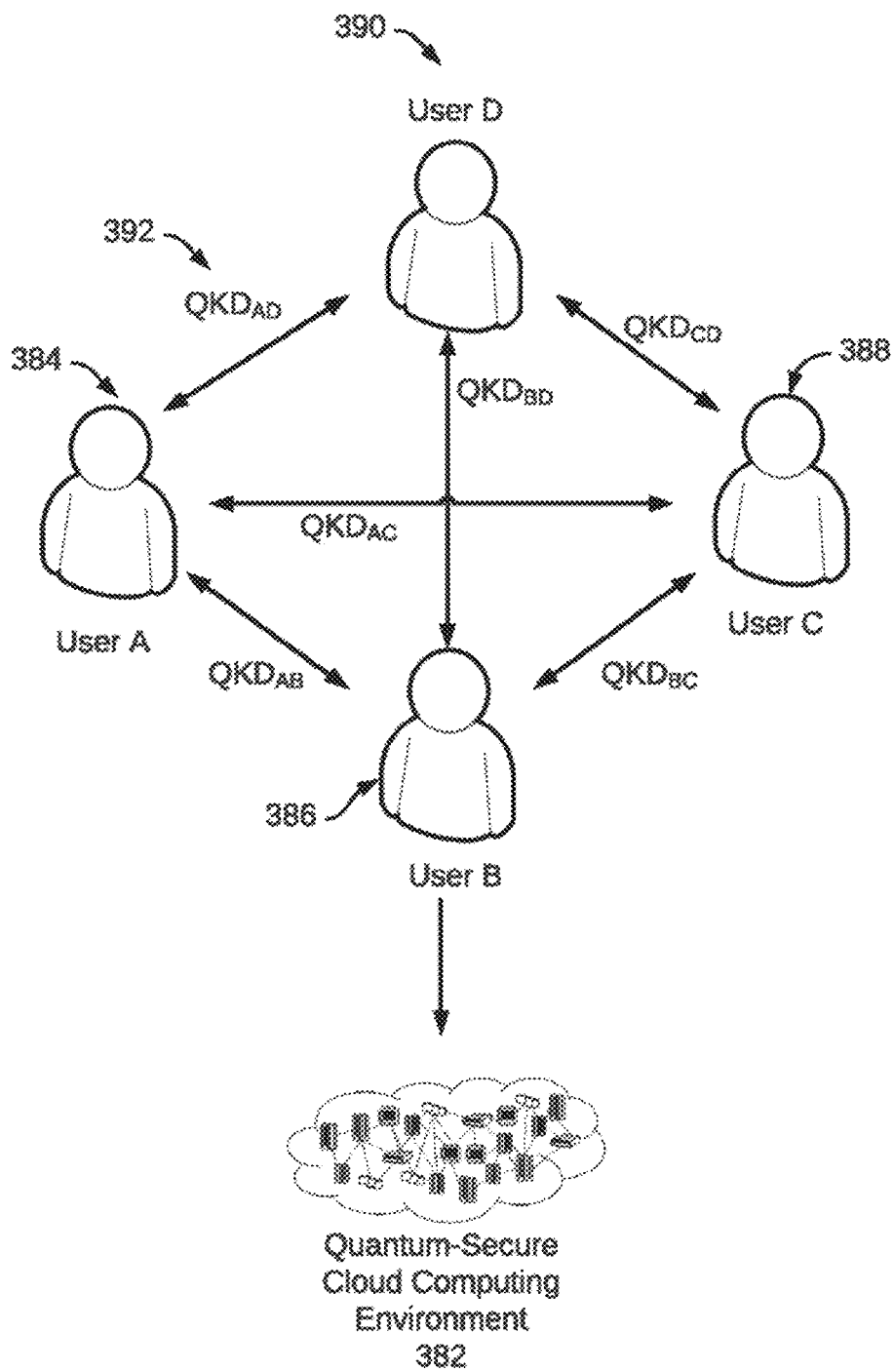
FIG. 3E illustrates an example of a quantum-secure cloud computing environment.

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 376 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376. Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance ("CBM") for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution ("QKD") to protect against a quantum computing attack. In this example, cloud computing users can verify each other's identities using QKD. This sends information using quantum particles such as photons, which cannot be copied by an eavesdropper without destroying them. In this way, a sender and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

FIG. 4A is a flow diagram of a process 400 whereby a microservice submits to a synchronizer process to synchronize it with other microservices supporting an application 96. When the microservice is told that it needs to start a new task, and that starting that task needs to be synchronized with the other microservices supporting the application 96, the microservice first does whatever is necessary to prepare itself for the task. If, for example, the task is using a new TLS certificate, then the microservice prepares itself by securing the appropriate TLS certificate.

When all of its preparations are complete, the microservice enters step 402 of the process 400. Here, the microservice causes its host computing device to write the microservice's ready-to-proceed entry to the shared database 10 (see FIG. 2B and the accompanying text). This entry contains a few data fields: (i) the identity of the microservice author or of its host computing device, (ii) an identifier of the cluster to which this microservice author belongs, and (iii) a count of the number of microservices in this particular cluster that support the application 96. In some embodiments, the entry also includes (iv) an identifier of the specific task to be synchronized (e.g., a hash of the new TLS certificate) and (v) an invalid time-to-proceed value (e.g., "0").

Once its entry has been written to the shared database 10, the microservice monitors it in steps 404 and 406. As long as the entry does not include a time-to-proceed value or only the (v) invalid time-to-proceed value, the microservice continues to monitor in steps 404 and 406.

In the normal course of things, the microservice entry will eventually be changed (see the text accompanying FIG. 4B to see how this happens) to include a valid time-to-proceed value. When this is noticed by the monitoring microservice (step 406), the microservice proceeds with the task (e.g., uses the new TLS certificate) starting at that time-to-proceed (step 408).

FIG. 4B is a flow diagram of a process 410 used by a synchronizer process when synchronizing the microservices of application 96. Before beginning the process 410, the synchronizer already knows that the application 96 wants to synchronize a task among its microservices and knows how many microservice clusters that application 96 uses.

In step 412, the synchronizer monitors the shared database 10 for ready-to-proceed entries written by microservices (using the process 400 of FIG. 4A).

While the synchronizer knows the number of microservice clusters supporting the application 96, it does not know initially the number of microservices within each cluster. However, it calculates a threshold count as follows (step 414): Start with 0. Add 1 for each cluster supporting the application 96 from which no ready-to-proceed entry is present. For each cluster for which at least one microservice has written an entry, add the count of microservices in that cluster (entry field (iii) discussed above in relation to step 402 of FIG. 4A). Note that this last addition to the count is done only once per cluster, not once per microservice in the cluster.

In step 416, the synchronizer compares its threshold count to the number of ready-to-proceed entries already present in the shared database 10. If the threshold count has not been reached, then the synchronizer continues to monitor for more ready-to-proceed entries, possibly updating the threshold count in step 414 as appropriate.

Finally, the number of entries equals the threshold count, and the synchronizer proceeds to step 418. The synchronizer writes the same time-to-proceed value into all of the ready-to-proceed entries. (The time-to-proceed value may be set 10 seconds or so into the future to allow all of the microservices to see it.) When the microservices see this in step 406 of FIG. 4A, they proceed (408), and the synchronization process is complete.

Note that if the application 96 calls upon its microservices to coordinate on starting multiple tasks, then the optional task identifier (field (iv) in the ready-to-proceed entry) keeps the multiple synchronization processes separate.

The steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
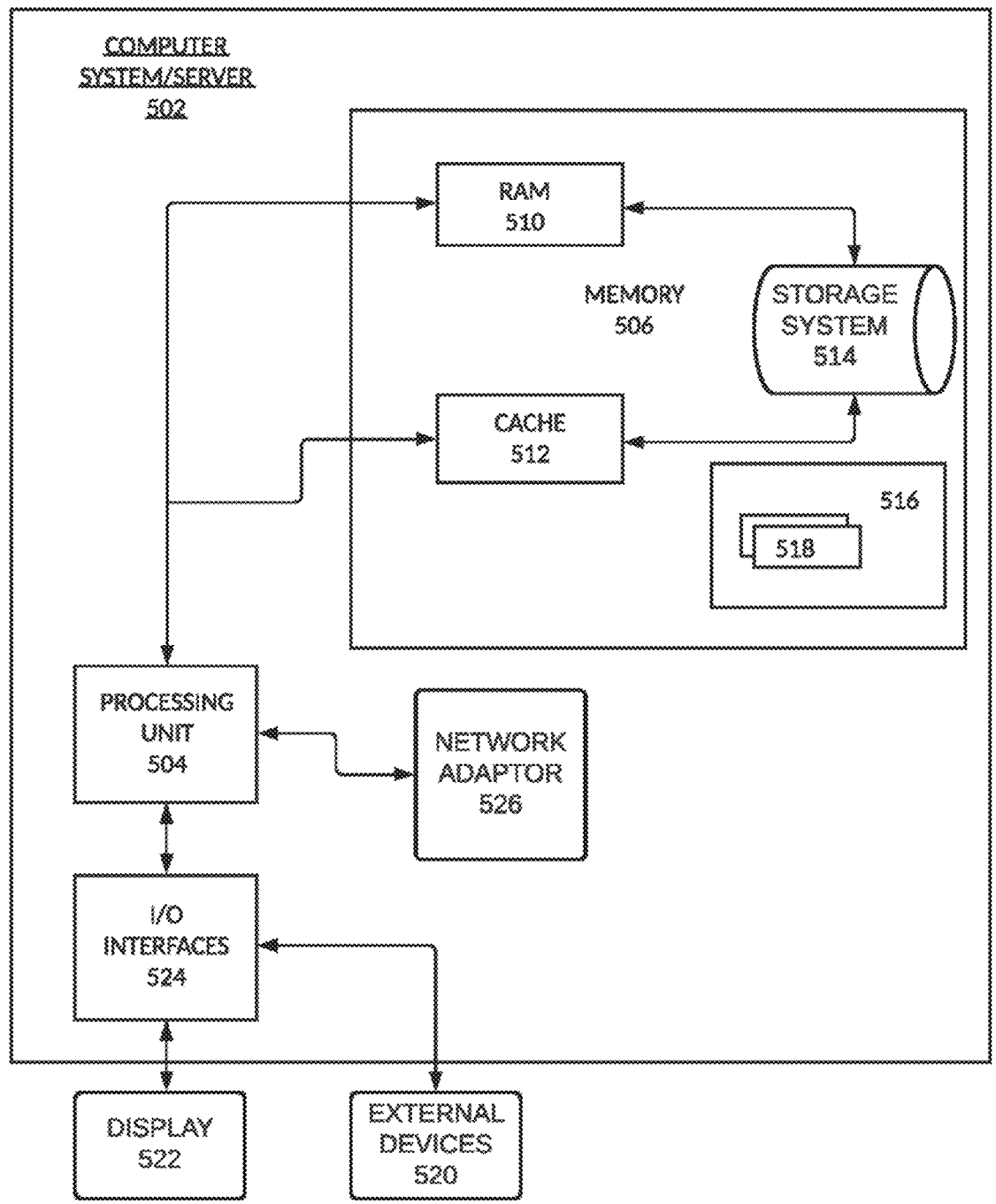
FIG. 5 illustrates an example system that supports one or more of the example embodiments.

FIG. 5 illustrates an example system 500 that supports one or more of the example embodiments described and/or depicted herein. The system 500 comprises a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ("ISA") bus, Micro Channel Architecture ("MCA") bus, Enhanced ISA ("EISA") bus, Video Electronics Standards Association ("VESA") local bus, and Peripheral Component Interconnects ("PCI") bus.

Computer system/server 502 typically includes a variety of computer system readable media. Such media may be any available media that is accessible by computer system/server 502, and they include both volatile and non-volatile media, removable and non-removable media. System memory 506, in one embodiment, implements the flow diagrams of the other figures. The system memory 506 can include computer system readable media in the form of volatile memory, such as random-access memory 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502;

and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network ("LAN"), a general wide area network ("WAN"), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a PDA, a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-readable storage medium storing instructions that when executed perform:
    monitoring a database for readiness-to-proceed entries written by members of a plurality of computing resources,
        wherein each computing resource of the plurality of computing resources is associated with one of a known plurality of clusters;
    determining, based on the monitored readiness-to-proceed entries and the known plurality of clusters, a threshold count for the plurality of computing resources, wherein
        the determining of the threshold count comprises:
            starting the threshold count at zero;
            adding one to the threshold count for each of the known plurality of clusters for which the monitoring has not seen a corresponding readiness-to-proceed entry of the readiness-to-proceed entries; and
            for each of the known plurality of clusters for which the monitoring has seen the corresponding readiness-to-proceed entry, adding to the threshold count a count of computing resources of the plurality of computing resources associated with each of the known plurality of clusters for which the monitoring has seen the corresponding readiness-to-proceed entry;

updating, based on a count of the monitored readiness-to-proceed entries that reaches the determined threshold count, the monitored readiness-to-proceed entries with a time-at-which-to-proceed value in the database; and synchronizing, based on the updated readiness-to-proceed entries that include the time-at-which-to-proceed value, the plurality of computing resources to start a specific task.

2. The computer-readable storage medium of claim 1, wherein the instructions when executed further perform:

recalculating the threshold count based upon the monitoring first seeing a readiness-to-proceed entry of the readiness-to-proceed entries.

3. The computer-readable storage medium of claim 1, wherein each cluster of the known plurality of clusters is selected from a group consisting of: a cluster of web microservices and a cluster of database microservices.

4. The computer-readable storage medium of claim 1, wherein each readiness-to-process entry of the monitored readiness-to-proceed entries comprises a task identifier, and wherein each of the monitoring, the determining, and the updating is directed only to a set of readiness-to-proceed entries, of the monitored readiness-to-proceed entries, comprising the same task identifier.

5. The computer-readable storage medium of claim 4, wherein the task identifier of each readiness-to-proceed entry of the monitored readiness-to-proceed entries is a hash value.

6. A computing system, comprising:

one or more first processors; and one or more first memories storing first instructions that when executed, by the first one or more processors, perform:

monitoring a database for readiness-to-proceed entries written by members of a plurality of computing resources, wherein each computing resource of the plurality of computing resources is associated with one of a known plurality of clusters;

determining, based on the monitored readiness-to-proceed entries and from the known plurality of clusters, a threshold count for the plurality of computing resources, wherein the determining of the threshold count comprises:

starting the threshold count at zero;

adding one to the threshold count for each of the known plurality of clusters for which the monitoring has not seen a corresponding readiness-to-proceed entry of the readiness-to-proceed entries; and for each of the known plurality of clusters for which the monitoring has seen the corresponding readiness-to-proceed entry, adding to the threshold count a count of computing resources of the plurality of computing resources associated with each of the known plurality of clusters for which the monitoring has seen the corresponding readiness-to-proceed entry;

updating, based on a count of the monitored readiness-to-proceed entries that reaches the determined threshold count, the monitored readiness-to-proceed entries with a time-at-which-to-proceed value in the database; and synchronizing, based on the updated readiness-to-proceed entries that include the time-at-which-to-proceed value, the plurality of computing resources to start a first task.

7. The computing system of claim 6, wherein the first instructions when executed further perform:

recalculating the threshold count based upon the monitoring first seeing a readiness-to-proceed entry of the readiness-to-proceed entries.

8. The computing system of claim 6, wherein each cluster of the known plurality of clusters is selected from a group consisting of: a cluster of web microservices and a cluster of database microservices.

9. The computing system of claim 6, wherein each readiness-to-proceed entry of the monitored readiness-to-proceed entries comprises a task identifier, and wherein each of the monitoring, the determining, and the updating is directed only to a set of readiness-to-proceed entries, of the monitored readiness-to-proceed entries comprising the same task identifier.

10. The computing system of claim 6, further comprising:

at least one computing resource of the plurality of computing resources, the at least one computing resource comprising:

one or more second processors; and one or more second memories storing second instructions that when executed, by the one or more second processors, perform:

writing, by the at least one computing resource, a readiness-to-proceed entry of the readiness-to-proceed entries to the database, the readiness-to-proceed entry comprising:

an identifier of the at least one computing resource, an identifier of a cluster of the known plurality of clusters with which the at least one computing resource is associated, and the count of computing resources associated with the cluster;

monitoring the readiness-to-proceed entry;

detecting, based on the monitoring, that the readiness-to-proceed entry includes the time-at-which-to-proceed value; and proceeding with the first task at the time-at-which-to-proceed value.

11. The computing system of claim 10, wherein the second instructions when executed further perform:

repeating the writing, the monitoring, the detecting, and the proceeding with a second task distinct from the first task, wherein an identifier of the second task differs from an identifier of the first task.

12. The computing system of claim 10, wherein the first task comprises using an element selected from a group consisting of: a security certificate, a shared password, an SSH key, and a JWT token.

* * * * *